April 12, 1932.  H. P. GOODLING ET AL  1,853,124
COTTON PICKER
Filed April 3, 1928   2 Sheets-Sheet 1
INVENTORS
Howard P. Goodling
W. L. Henderson
BY
ATTORNEY

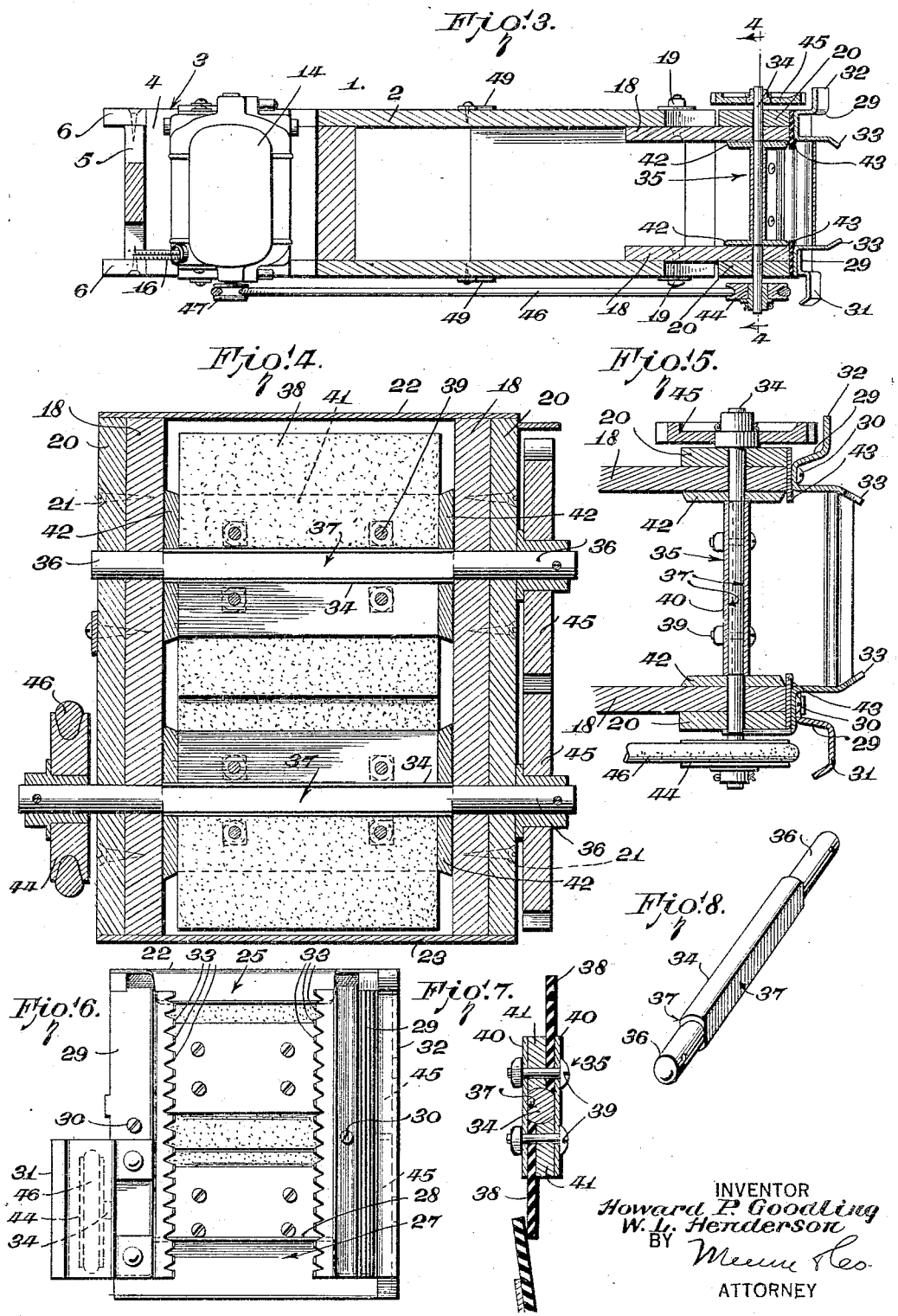

Patented Apr. 12, 1932

1,853,124

UNITED STATES PATENT OFFICE

HOWARD P. GOODLING, OF YORK, PENNSYLVANIA, AND WILEY L. HENDERSON, OF MOBILE, ALABAMA

COTTON PICKER

Application filed April 3, 1928. Serial No. 267,008.

This invention relates to improvements in cotton pickers, and it consists of the constructions, combinations and arrangements herein described and claimed.

An object of the invention is to provide an electrically operated, hand controlled, mechanical cotton picker, which constitutes a device that is light enough to be carried and manipulated by one hand of an operator, yet wholly adequate in its structural aspects to stand up under the continuous, vigorous and more or less rough use to which it will be put.

Another object of the invention is to provide a cotton picker of the foregoing character, in which the electric driving motor, which constitutes the heaviest element, is so disposed in respect to a handle that the weight of the device is well balanced.

Another object of the invention is to make possible the simultaneous use of a number of electrically operated mechanical cotton pickers in a field that is isolated from a source of electrical current, the mode of accomplishment being the transportation into the field of a conveyance carrying a power generating unit from which a sufficient number of wires radiate.

Other objects and advantages appear in the following specification, reference being had to the accompanying drawings, in which Figure 1 is a perspective view illustrating the principle of the invention, Figure 2 is a longitudinal section of the cotton picker, Figure 3 is a horizontal section taken on the line 3—3 of Figure 2, the motor being left in plan, Figure 4 is a cross section of the mouthpiece taken on the line 4—4 of Figure 3, particularly illustrating the impellers or flappers that comprise the gripping means, Figure 5 is a detail horizontal section of the mouthpiece taken on the line 5—5 of Figure 2, Figure 6 is a detail front elevation of the mouthpiece, Figure 7 is a fragmentary diagram illustrating the overlapping arrangement of the flexible flappers, Figure 8 is a detail perspective view of one of the impeller shafts.

The difficulties of producing a cotton crop do not end with the cultivation of the plants to a point whereat the ripe cotton is ready to be picked, but extend to no small degree, to the operation of removing the cotton. Many expedients have been devised and tried out, each with the view of removing the cotton most expeditiously and efficiently.

However, no cotton crop has ever been known to be subject to any fixed rule, so that a condition obtaining at one period in a single season, or in various seasons, may not be encountered at other times. For instance, it is not uncommon to extend the harvesting of a single cotton crop over three periods, that is to say, it is not unusual to go over the same field three times before all of the cotton has been picked.

The reason for the latter condition is that all of the cotton does not ripen at the one time. With this condition in mind it is readily seen that leaves on one plant, which are comparatively fresh during the first picking, may have become withered and dried by the time the cotton is ready for the third picking.

It is thus possible to have a yield of cotton full of dried leaves, stalks, etc., as the result of the last picking. Climatic conditions between seasons may also make a vast difference in the character of the plants and of the cotton.

Inasmuch as most types of cotton picking machinery have no provisions for discriminating between that which is good and bad, it follows that the product of the cotton field may either be suitable or of a very low grade. It also happens to be the case that most cotton fields are situated in regions where various kinds of power is not available for the purpose of operating mechanical cotton pickers. It is now the custom to choose between a portable power plant or to pick the cotton by hand labor.

It has been estimated that the major bulk of cotton is removed by hand labor, and that of negroes. Hand labor is usually slow, but negro hand labor is painfully so. The foregoing lack of discrimination of mechanical cotton pickers seems no less apparent when the crop is harvested according to the last mode.

While the improved cotton picker, disclosed herein, does not dispense with hand labor, yet the nature of it is such that the judgment of the operative will be put on probation, and his efficiency as an operator will be increased several hundred percent. All that he has to do is to present the mouthpiece of the device to a ripe cotton boll and press the trigger, whereupon the device will do the rest. It would show a lack of judgment to present the mouthpiece to an unripe cotton boll or to a stalk full of leaves.

Reference is now made to the drawings. The body of the device, generally designated 1, comprising the following parts: a pair of sides 2 which have rear end projections 3, a platform 4 on said projections, a rear brace 5 beyond which the projections 3 extend slightly as at 6, a rear inclined closure plate 7, a bottom 8 and a top 9. The bottom 8 stops short of the closure plate 7 thus leaving a discharge opening 10. The top 9 also stops short of the plate 7 thus leaving a top opening 11 that may be variously used as an observation or hand hole.

A bridge 12 is part of the body and spans the distance between the rear brace 5 and the closure plate 7. It provides a mounting for a combined handle-switch 13. It also assists in partially housing an electric motor 14 that is fastened down upon the platform 4. A trigger 15 permits the operator to start and stop the motor with one finger of the hand that grips the handle 13.

A feed wire 16 conducts electrical current to the motor 14. The switch mechanism 17, located within the handle 13, is interposed. Upward pressure on the trigger 15 will close a circuit through the motor, while a release of the pressure will open the circuit. The switch arrangement may be such that a depression and release of the trigger will keep the switch closed, while the next depression and release will again open the switch.

Situated at the front of the body is a mouthpiece that contains the gripping means. This mouthpiece is actually an integral part of the body 1, but the description of the construction is thus set apart in order to emphasize the peculiar features thereof. It is set at an angle to the body, thus enabling the operative to readily direct and present the device to ripe cotton situated relatively low or at the under sides of a plant without excessive stooping. It is observed in Figure 2 that the general direction of the cotton passageway within the device is rearward and downward.

Side plates 18 are secured to the front ends of the sides 2 as at 19. The securing device may comprise ordinary bolts and nuts so that the mouthpiece may readily be disassembled from the body should there be an occasion. The side plates have facing plates 20 attached thereto as at 21, this particular arrangement being incidental to the original mode of manufacture. In practice the side and facing plates may be made in one, and for the purpose of this description said plates are collectively known as the side plates.

Upper and lower guard plates 22 and 23 form continuations of the top 9 and bottom 8 over the mouthpiece. The upper guard is concaved at 24 prior to being bent downwardly at 25.

The lower guard plate is similarly concaved at 26 prior to being bent upwardly at 27 in the forward direction to provide a narrow lip 28. Front plates 29, suitably secured at 30 to the front edges of the side plates 18 constitute both wheel and entrance guards. For the first purpose they are respectively formed and bent as at 31 and 32. For the second purpose they are bent forwardly and provided with toothed edges as at 33.

Journalled upon the side plates 18 is a pair of shafts 34 by which impellers or flappers 35 are carried. The flappers constitute the gripping means by which the cotton is pulled into the device and is thrown rearwardly and downwardly. The formation of the shafts and mode of mounting the flappers thereon is subject to considerable variation, but a characteristic construction comprises the reduction of the shaft ends as at 36 which leaves an enlarged central portion, opposite sides of which are flattened as at 37.

The flappers comprise pairs of strips 38 of rubber or other flexible material. Each strip is fastened at one edge only as at 39. The remaining edges are free, and it is by virtue of the interaction of these edges that cotton is removed from the plants. The strips are disposed tangentially of the shafts 34, extending in directions opposite from each other at opposite sides of the shafts. The arrangement is shown in Figure 7. The outermost surfaces of the strips are flush with the flattened sides 37.

Metallic binder plates 40 and suitable spacers 41 complete the mounting of the flexible strips. The transverse edges of the binder plates abut discs 42. These, in turn run close to the inside of the side plates 18. The transverse edges of the flexible strips are flush with the end discs. These edges of the strips will wipe over flexible inserts 43, located between the front plates 29 and the front edges of the side plates 18.

The purpose of the end discs is to prevent choking of the mouthpiece by the wrapping of the cotton around the shafts 34 at the points where the shafts pass through the sides. This purpose is aided by the action of the strip edges against the inserts 43. The strip edges move closely past the inserts and brush off any lint tending to adhere thereto at places that are directly in front of the discs. Substantially the same effect could be gotten by sinking the end discs in circular recesses in the side plates.

One of the shafts 34 projects at one side of the device to carry a pulley 44. The other end of the same shaft and one end of the remaining shaft project at the other end of the device to carry gears 45. These gears mesh in order to drive both shafts simultaneously when power is applied to the pulley 44. Such power application is through a belt 46 from a pulley 47 on one end of the shaft of the motor 14. It is to be observed that the flapper strips pass through the concavities 24 and 26 to the upper and lower guard plates when in motion.

A flexible spout 48 is attached to the cotton picker in such manner that the opening 10 communicates therewith. The spout may be made to discharge into any ordinary cotton picking bag such as is usually carried by an operative, or it may be made to discharge into a basket as suggested in Figure 1. It is also possible to discharge the contents of the spout into a suitable mechanical conveyor whence it may be conducted to any desired point.

The rear extensions 6 and a pair of hooks 49 provide a place of attachment for the spout. A strip of elastic 50 will tend to hold the spout in place, but the holding of the spout is insured by a draw string 51 which may be tied tight. If desired, the device may be equipped with a shoulder strap 52 (Fig. 1) by which some of the weight of the cotton picker may be borne.

Electrical power is preferably supplied by a generating unit 53 that is carried into the field. A truck or wagon 54 of any suitable description comprises the conveyance for the generating unit, as well as for a trolley pole 55, suitable switch 56 and all of the necessary appurtenances. The feed wires, of which one has already been mentioned in connection with the handle-switch, radiate from the power generating unit.

The operation is readily understood. The picking device is sufficiently light to enable the operative to direct it through all necessary manipulations without excessive fatigue. The combined handle-switch 13 is located directly over the electric motor 14 which is the element of greatest weight in the device. This arrangement properly balances the weight of the device. The device is readily manipulated by one hand, one of the fingers of the hand depressing or releasing the switch trigger 15 as may be required.

Closure of the electrical circuit through the motor will set the gripping means into rapid revolution. The flappers 35 will revolve toward each other and toward the center of the cotton passageway (Fig. 2).

The action of the flappers is to pick or pull the ripe cotton from the plant, and throw it rearwardly and downwardly through the passageway in the body 1 into the flexible spout 48. The speed of rotation of the flappers performs the throwing act. They also induce a current of air which facilitates passage of the cotton.

The purpose of the toothed edges 33 is as follows: They tend to cause the cotton to be drawn out into shreds. The mass of incoming cotton is separated, in a manner, so that it will not be drawn into the picker in large balls that might tend to choke the mechanism. The action of the flappers is vigorous, and as soon as the mouthpiece is presented to a quantity of ripe cotton the latter will immediately be pulled from the plant and thrown into the picker.

Inasmuch as each boll of ripened cotton is quite large and the entrance of the mouthpiece is rather narrow, it follows that the toothed edges 33 will strike the cotton in its medial parts. Some of the cotton will be pressed into the mouthpiece by virtue of the engagement therewith of the device. The revolving flappers will pull such portions of the cotton in, the remaining portions being drawn past the teeth 33 with the effect already described. The teeth tend to retard the inward passage of the cotton. They prevent it from being thrown into the device in large balls.

The interaction of the flexible strips is well illustrated in Figures 2 and 7. They overlap as shown when passing each other. As the strips 38 approach each other at the center of the mouthpiece they gradually take in the cotton and ultimately exert a pull thereupon.

The flexibility of the strips compensates for any variation in the volume of cotton, for instance a seed or number of seeds may produce a lump. As the flappers separate, after having passed each other, they throw the cotton rearwardly and downwardly. The action of the flappers is that of a continuous pull.

The various guard plates define the entrance of the mouthpiece. It has been explained already that the front plates 29 act as guards for the entrance to the mouthpiece. They also serve as guards for the pulley 44 and gears 45, the members 31 and 32 performing these particular functions.

Mention has been made of the fact that various modes can be utilized of disposing of the picked cotton. While such modes have no direct bearing on the invention, it is believed desirable to say that the top opening 11 is well adapted to the attachment of a hose or tube of a suction fan. By means of an arrangement, such as suggested, it would be possible to immediately convey the cotton to a remote point by means of suction, thus obviating the necessity for either a basket, bag or ponderous mechanical conveyor.

While the construction and arrangement of the improved cotton picker is that of a generally preferred form, obviously modifications and changes may be made without departing from the spirit of the invention or the scope of the claims.

We claim:

1. A cotton picker comprising a body having a mouthpiece, gripping means in the mouthpiece comprising flappers, and means by which the flappers are revolubly carried in such angular positions as to periodically overlappingly engage.

2. In a cotton picker, a body having a mouthpiece, driven shafts journalled on the mouthpiece, and flexible flappers tangentially carried by and oppositely directed in respect to each shaft, said flappers being sufficiently long to overlap when passing thus to draw cotton into the mouthpiece and throw it into the body, and means on which the flappers are secured in said positions.

3. In a cotton picker, a mouthpiece, revoluble shafts journalled upon the mouthpiece one above the other, flexible flappers attached at one edge to each shaft and being sufficiently long to overlap when passing, and means on the shafts at the ends of the flappers adjoining the mouthpiece preventing the cotton from wrapping around the shafts.

4. In a cotton picker, a mouthpiece having revoluble shafts journalled therein, flexible flappers secured to the shafts and being sufficiently long to overlap when passing, and discs on the shafts with which discs the ends of the flappers abut to prevent the cotton from wrapping around the shafts.

5. In a cotton picker, a mouthpiece having side plates, and upper and lower guard plates, shafts journalled on the side plates, means for revolving the shafts in determined directions, flexible flappers carried by the shafts being long enough to overlap when passing and thus draw in cotton, discs on the shafts adjacent to the side plates and in abutment with the ends of the flappers to prevent cotton from wrapping around the shafts, front plates attached to the mouthpiece, and flexible inserts between the front plates and side plates bearing against the peripheries of the discs to aid the foregoing function.

6. A cotton picker comprising a body having a passageway with a discharge opening at one side thereof, a mouthpiece having its longitudinal axis at an acute angle to the longitudinal axis of the passageway, and gripping means disposed in the mouthpiece for movement transversely of the axis thereof to throw cotton crosswise of said passageway toward said discharge opening.

7. In a cotton picker having a mouthpiece and revoluble interacting grippers, guard means at the sides of the entrance to the mouthpiece hence spaced to leave the center unobstructed, and serrations on confronting portions of the guard means by which the cotton is shredded as drawn in.

8. A cotton picker body having a cotton discharge opening, a pair of sides projecting in one direction from the body to provide extensions at one side of the opening, and hooks attached to the body adjacent to the other side of the opening and pointing in the opposite direction.

HOWARD P. GOODLING.
WILEY L. HENDERSON.